(12) United States Patent
Dommnik (10) Patent No.: US 12,129,911 B2
(45) Date of Patent: Oct. 29, 2024

(54) MULTI-PART CHAIN LINK OF AN ENERGY CHAIN, AND TRANSVERSE CONNECTING PIECE AND SIDE PLATE THEREFOR

(71) Applicant: IGUS GMBH, Cologne (DE)

(72) Inventor: Joerg Dommnik, Neunkirchen-Seelscheid (DE)

(73) Assignee: IGUS GMBH, Cologne (DE)

( * ) Notice: Subject to any disclaimer, the term of this patent is extended or adjusted under 35 U.S.C. 154(b) by 470 days.

(21) Appl. No.: 17/310,611

(22) PCT Filed: Feb. 17, 2020

(86) PCT No.: PCT/EP2020/054129
§ 371 (c)(1),
(2) Date: Aug. 13, 2021

(87) PCT Pub. No.: WO2020/165460
PCT Pub. Date: Aug. 20, 2020

(65) Prior Publication Data
US 2022/0170530 A1 Jun. 2, 2022

(30) Foreign Application Priority Data
Feb. 15, 2019 (DE) ...................... 20 2019 100 878.4

(51) Int. Cl.
*F16G 13/16* (2006.01)
*F16G 15/12* (2006.01)
(Continued)

(52) U.S. Cl.
CPC ............. *F16G 13/16* (2013.01); *F16G 15/12* (2013.01); *H02G 11/006* (2013.01)

(58) Field of Classification Search
CPC .................................. F16G 13/16; F16G 15/12
See application file for complete search history.

(56) References Cited

U.S. PATENT DOCUMENTS

| 4,104,871 A | 8/1978 | Moritz |
| 4,626,233 A | 12/1986 | Moritz |

(Continued)

FOREIGN PATENT DOCUMENTS

| CN | 102808900 | 12/2012 |
| CN | 205669561 | 11/2016 |

(Continued)

OTHER PUBLICATIONS

English translate (DE3408912C1), retrieved date Apr. 2, 2027.*
(Continued)

*Primary Examiner* — Mohammed S. Alawadi
(74) *Attorney, Agent, or Firm* — Grossman, Tucker, Perreault & Pfleger, PLLC (57) ABSTRACT

The design of chain links for energy chains for movably carrying cables, hoses and the like. The chain link consists of a plurality of individual parts, namely two side plates made of plastic, comprising an interior side facing the interior of the chain link, an exterior side facing away therefrom and two narrow sides running substantially parallel to the longitudinal direction, and at least one, more particularly two transverse connecting pieces for detachably connecting the side plates, comprising a center part and a fastening portion at each end of the transverse connecting piece on both sides. The side plates have, on at least one narrow side, a corresponding fastening region for frictionally fastening a transverse connecting piece, namely a clamping receptacle which has two clamping surfaces, which are opposite one another in the longitudinal direction and between which a complementarily shaped fastening portion of the at least one separate transverse connecting piece is clamped. Each transverse connecting piece has two support protrusions on each fastening portion, each support protrusion having a support surface for resting against the (Continued)

interior side of the side plate in order to achieve a robust connection. Providing the side plate, in the central region between the fastening regions, with a special functional cut-out in the plate body, which cut-out facilitates additional functions or application expansions.

8 Claims, 4 Drawing Sheets

(51) Int. Cl.
*H02G 3/04* (2006.01)
*H02G 11/00* (2006.01)

(56) References Cited

U.S. PATENT DOCUMENTS

| | | | |
|---|---|---|---|
| 4,813,224 | A | 3/1989 | Blase |
| 5,038,556 | A | 8/1991 | Moritz et al. |
| 5,184,454 | A | 2/1993 | Klein et al. |
| 5,711,733 | A * | 1/1998 | Blase ............... H02G 11/006 474/227 |
| 5,768,882 | A | 6/1998 | Weber et al. |
| 5,980,409 | A | 11/1999 | Blase |
| 6,161,372 | A | 12/2000 | Wehler |
| 8,720,178 | B2 | 5/2014 | Wendig et al. |
| 9,670,987 | B1 * | 6/2017 | Stolz ............... F16G 15/12 |
| 9,897,163 | B2 | 2/2018 | Jaeker et al. |
| 2003/0182924 | A1 | 10/2003 | Tsutsumi et al. |
| 2017/0108082 | A1 * | 4/2017 | Barten ............... F16G 13/16 |
| 2020/0130942 | A1 * | 4/2020 | Tetsuka ............... H02G 11/00 |

FOREIGN PATENT DOCUMENTS

| | | | |
|---|---|---|---|
| CN | 106461026 | | 2/2017 |
| CN | 205956309 | | 2/2017 |
| CN | 208331129 | | 1/2019 |
| DE | 2437742 | | 2/1976 |
| DE | 3408912 | | 8/1985 |
| DE | 3408912 | C1 * | 8/1985 |
| DE | 3531066 | | 3/1987 |
| DE | 3909797 | | 4/1990 |
| DE | 4121433 | | 2/1993 |
| DE | 4313075 | | 11/1994 |
| DE | 19547221 | | 6/1997 |
| DE | 10004679 | | 8/2001 |
| DE | 102004017742 | | 11/2005 |
| DE | 19547221 | B4 * | 5/2007 ............ F16G 13/16 |
| DE | 102006027246 | | 12/2007 |
| DE | 60317131 | | 8/2008 |
| DE | 102008060466 | | 6/2010 |
| DE | 202012003947 | | 7/2012 |
| DE | 202016007395 | | 4/2018 |
| EP | 0161417 | | 3/1985 |
| EP | 0384153 | | 1/1990 |
| EP | 0803032 | | 10/1997 |
| JP | 2000-213603 | | 8/2000 |
| JP | 2001-513173 | | 8/2001 |
| JP | 2001-315642 | | 11/2001 |
| WO | 95/28582 | | 10/1995 |
| WO | 2016146706 | | 9/2016 |

OTHER PUBLICATIONS

English translate (DE19547221B4), retrieved date Apr. 3, 2027.*
International Search Report from corresponding PCT Appln. No. PCT/EP2020/054129, dated Jun. 3, 2020.
International Preliminary Report on Patentability from corresponding PCT Appln. No. PCT/EP2020/054129, dated Aug. 10, 2021.
Office Action from related Brazilian Appln. No. BR112021014584-2, dated Jun. 6, 2023. English translation attached.
Office Action from related Chinese Appln. No. 202080021444.7, dated Jan. 12, 2023. English translation attached.
Office Action from related Indian Appln. No. 202137041475, dated Feb. 15, 2023. English translation attached.
Written Opinion from related Singaporean Appln. No. 11202110154V, dated Apr. 20, 2023. English translation attached.
Office Action from related Japanese Appln. No. 2021-547387, dated Jan. 23, 2024. English translation attached.
Office Action from related Japanese Appln. No. 2021-547387, dated Jul. 2, 2024. English translation attached.

* cited by examiner

MULTI-PART CHAIN LINK OF AN ENERGY CHAIN, AND TRANSVERSE CONNECTING PIECE AND SIDE PLATE THEREFOR

FIELD

The present invention relates generally to energy guiding chains for dynamically guiding lines, such as, for example, hoses, cables or the like, between two connection points, at least one of which is relatively movable to the other. Energy guiding chains of the generic type comprise a plurality of chain links chained in the longitudinal direction of the energy guiding chain and connected to one another in succession and in each case pivotably. The side plates of the chain links are typically connected to one another in a pivotable manner by a swivel joint connection to form a plate strand on each side of the energy guiding chain.

The invention relates in particular to an energy guiding chain comprising chain links that are composed of several individual parts, namely substantially of respectively two side plates and of at least one, and in particular of two separate transverse connecting pieces opposite one another, which detachably connect the two side plates to one another. Each side plate has a plate body made of plastic, which has an interior side facing the interior of the chain link, an exterior side facing away therefrom and two narrow sides running substantially parallel to the longitudinal direction of the energy guiding chain. The separate transverse connecting pieces serve as traverses for connecting the side plate and can in principle have any suitable design. The detachable connection of a separate transverse connecting piece to the plates allows, among other things, an easier insertion and, if necessary, exchange of lines during production and maintenance.

BACKGROUND

For chain links made of several, in particular of four, individual parts, the detachable connection between the separate transverse connecting pieces and the side plates is achieved in that each separate or single-part transverse connecting piece comprises a fastening portion on both sides at each end and the side plates each have a corresponding fastening region on each of their narrow sides, which fastening region interacts, by form-fitting connection (positive connection) and/or frictional connection (non-positive connection), with a fastening section of the transverse connecting piece.

A design of this type, which has proven itself very well in practice, has been proposed in patent DE 35 31 066 C2 and U.S. Pat. No. 4,813,224 A. The side plates have inwardly protruding latching catches or latching horns having an approximately hexagonal cross-section as fastening regions for the transverse connecting pieces. The transverse connecting pieces are latched onto these with corresponding latching recesses at the end. This design allows a robust and durable connection between the side plates and transverse connecting pieces. It has also been incorporated into other successful designs having four-part plastic chain links, such as described in patent EP0803032B1.

However, due to the complex component geometry, this design of the fastening portions on the transverse connecting pieces or the fastening regions on the side plates requires relatively complex molding tools for production in injection molding technology. In addition, the inwardly protruding latching catches can make it more difficult to insert or remove lines during production or maintenance.

A solution without inwardly protruding fastening regions on the side plates is known from the non-generic domain of energy guiding chains made of metal plates, the manufacturing process of which, however, differs in every respect from that for plastic plates. For example, it has already been proposed in U.S. Pat. No. 4,104,871 A to fasten the side plates, there fork-shaped double plates, with the transverse connecting pieces by means of screw connections. However, this approach is only suitable to a limited extent for chain links made of plastic parts and, despite such suggestions as, for example, in DE 10 2004 017 742 A1, has so far not been able to establish itself in practice.

In energy guiding chains having chain links made of plastic parts, connections that can be swiveled open between a swiveling transverse connecting piece or opening connecting piece have been proposed for two-part chain links, in which the fastening region does not protrude or only slightly protrudes inward on the side plates, as, for example, in DE 43 13 075 A1. Here, pivot pins are loosely rotatably latched in a seat on the narrow side and the connection is ensured in the closed state by an inwardly protruding latching catch on the side plate. However, this design is basically only suitable for two-part chain links having side plates that are made in one piece or made of the same material with one of the two transverse connecting pieces. This, in turn, is also relatively complex in terms of production technology.

An approach which avoids inwardly protruding parts of the fastening regions on the side plates was proposed in patent DE 41 21 433 C1. In this case, recesses are provided on the opposite edges of the side plates for receiving the ends of the transverse connecting pieces, which are provided with undercuts and protrusions in the region of the recesses that fill in at a distance from the edges of the plates for connection to complementarily shaped ends of the transverse connecting pieces. In this case, a form-fit with the undercuts and protrusions is to be achieved, against the unwanted detachment of which additional locking means are provided. This approach is structurally very complex, in particular with regard to the injection molding of the side plates and the transverse connecting pieces, thus cost-intensive and also disadvantageous in terms of handling because of the separate locking means.

In the disclosed documents DE 10 2008 060 466 A1 and DE 10 2006 027 246 A1, chain links according to the preamble of claim 1 were proposed, namely with clamping seats on the narrow sides of the side plates. In these solutions, the clamping seats are used to fasten transverse connecting pieces which are made completely or at least partially from extruded profiles or endless profiles made of metal, in particular of aluminum. This design requires possible cutting of the transverse connecting pieces to the desired width of the chain links and increases material costs, among other things. An earlier approach of a similar type can already be found in the earlier disclosure EP 0 384 153 A2, in which light metal pipe sections are clamped form-fittingly as transverse connecting pieces in seats in the plates. For this purpose, as also in DE 10 2008 060 466 A1, the side plates have a geometry with undercuts that is complex to produce.

SUMMARY

First Aspect of the Invention

A first object according to a first aspect of the present invention is therefore to propose an improved type of detachable fastening between two side plates and at least one of two transverse connecting pieces in energy guiding chains comprising multi-part chain links, in particular four-part chain links. The connection should be as robust as possible and yet it should be possible to produce the side plates and transverse connecting pieces using relatively simple injection molding tools.

In a generic energy guiding chain or a chain link, it is initially provided that the fastening region of a side plate for fastening a transverse connecting piece comprises a clamping seat or edge recess (as the case may be) in the plate body, which clamping seat or edge recess springs back into the narrow side of the side plate, and that this seat respectively mounting recess has two clamping surfaces opposite one another in the longitudinal direction, between which a complementarily shaped fastening portion of a transverse connecting piece can be clamped for fastening with the side plate. This enables in particular a firm fastening, in particular an angularly stable or immovable fastening, can be achieved, which does not detach unintentionally during operation.

The plate body thus forms the clamping surfaces and, by means of these clamping surfaces, holds the inserted fastening portion and thus the transverse connecting piece in a stable manner. This allows a firm connection by non-positive resp. frictional connection, in the manner of a clamping connection or press connection, wherein relatively high clamping or pressing forces can be achieved by utilizing the more massive plate body compared to the transverse connecting piece and the inherent elasticity of the plastic. With the seat or recess according to the invention, the side plate itself forms, so to speak, a claw or clamp into which a geometrically simple, for example, complementary fastening portion made of solid material can be clamped or pressed, wherein the entire plate body can apply a correspondingly high clamping or pressing force. In contrast to this, in the prior art, typically only the transverse connecting piece applies the holding force, but this has relatively low material thicknesses in the force-transmitting regions.

The complementary fastening portion of the transverse connecting piece can have an oversize in cross-section relative to the seat or recess. The transverse connecting piece should only be able to be assembled by hand, ideally without tools, and, if necessary, dismantled with a tool, for example, by means of a flat screwdriver, but preferably by hand only when a lot of force is exerted.

In a particularly preferred embodiment, to achieve the first-mentioned object in combination with the aforementioned clamping seat of the side plate, it is further provided that the at least one transverse connecting piece is made in one piece from plastic and in the end region adjacent each fastening portion or between fastening portion and center part, has two support protrusions, each having a support surface for resting against the interior side of the side plate. The two support protrusions protrude in particular on both sides with respect to the center part, that is, each form a protrusion in the longitudinal direction of the side plate or transversely to the longitudinal extent of the transverse connecting piece itself.

The combination of clamping seat in the side plate and support protrusions on the transverse connecting pieces, which are supported on the inside on the side plates, enables a particularly rigid and firm connection between the side plates and transverse connecting pieces.

To form such support protrusions, the cross-section of the transverse connecting piece can be designed to widen or become larger perpendicular to its longitudinal axis, both in the longitudinal direction of the side plate or energy guiding chain and inwardly towards the receiving space in the chain link.

In side view, the area dimension of each of the two support surfaces effective for adjacent support can preferably each relate to at least 33%, preferably at least 40% of the open cross-section of the clamping seat.

The proposed firm connection between the side plate and the transverse connecting piece can be designed with as little play as possible, in particular non-rotatable respectively torsionally rigid, in all three spatial directions, that is, around the longitudinal direction, around the height direction and around the transverse direction or thickness direction of the side plate, in order to guarantee a stable, durable box shape of the chain links.

In addition to the frictional connection according to the invention, a form-fit, a latching connection or the like can be provided by shaping the seat or recess.

The use of an edge-side seat or recess in the side plate also eliminates the need for laterally protruding parts to provide a fastening portion and a simpler molding tool can be used both for the production of the side plate and for the transverse connecting piece.

Correspondingly, the first aspect of the invention provides for a side plate that comprises at least one fastening region, in particular each of two fastening regions opposite one another, a clamping seat in the plate body, which clamping seat has two clamping surfaces formed by the plate body and opposite one another in the longitudinal direction, between which a complementarily shaped fastening portion of a transverse connecting piece can be frictionally fastened, in particular clamped in respectively pressed in.

Each narrow side runs substantially parallel to a longitudinal direction of the side plate, which in the extended position corresponds to the longitudinal direction of the energy guiding chain. The clamping seat springs back in the respective narrow side and can in particular be designed as an edge recess in the narrow side.

In a preferred development, to secure the separate transverse connecting piece against displacement perpendicular to the main plane of the plate, it is provided that each clamping seat has an elongated transverse locking protrusion extending in the longitudinal direction in order to hold the transverse connecting piece in the direction of its longitudinal axis by engaging a complementary elongated transverse locking groove in the fastening portion. Equivalent to this is a reverse design in which each clamping seat has an elongated transverse locking groove extending in the longitudinal direction in order to hold it against displacement perpendicular to the main plane of the plate by engaging a complementary elongated transverse locking protrusion on the fastening portion of a transverse connecting piece.

Alternatively or additionally, it can be provided against transverse displacement that the clamping seat or the fastening portion of a transverse connecting piece expands perpendicular to the main plane of the plate towards the exterior side or has an enlarging cross-section, for example, similar to a tongue and groove connection in a dovetail shape. Alternatively or additionally, it can also be provided for this that the fastening portion, with an end-side protrusion protruding towards the center of the plate, overlaps a corresponding recess on the exterior side of the side plate. The two last-mentioned design options also allow, for example, a pretensioning of the support protrusions with their support surfaces against the interior side of the side plate.

According to the first aspect of the invention, a corresponding transverse connecting piece of the two fastening portions made as a single part has two counter-clamping surfaces facing away from one another and facing in the direction perpendicular to the longitudinal axis of the transverse connecting piece, for interaction with the complementary clamping surfaces of a side plate. A transverse connecting piece is proposed for a particularly robust fastening between the transverse connecting piece and the side plate.

In this case, each of the two fastening portions has two counter-clamping surfaces facing away from one another and facing in the direction perpendicular to the longitudinal axis of the transverse connecting piece, for interaction with the complementary clamping surfaces of a side plate. Furthermore, the transverse connecting piece has in particular two support protrusions, each having a support surface for resting against the interior side of the side plate. Such support protrusions can be provided in the end region adjacent each fastening portion and protruding on both sides with respect to the center part and are preferably made in one piece, in particular made of the same material, with the transverse connecting piece.

In this case, the transverse connecting piece has in particular at least one solid material region continuous between these counter-clamping surfaces in order to absorb the holding forces applied by the clamping seat. Viewed in isolation, the fastening portion can be designed at least in some regions, in particular predominantly, continuously or consistently as a solid body, with the exception of a transverse locking groove, for example. The fastening portion is preferably made continuously from solid material in the space between its counter-clamping surfaces, which enables a robust clamping or press connection in the clamping seat. Continuously here refers to the longitudinal direction of the side plate or the direction perpendicular to the longitudinal axis of the transverse connecting piece.

The transverse connecting piece can in particular be produced as a one-piece body made of plastic that extends along a longitudinal axis, in particular symmetrically to a center plane perpendicular to the longitudinal axis. It typically has a plate-like center part and a fastening portion on both sides at each end for connection to a side plate.

The fastening portions opposite one another are preferably of identical construction and symmetrical, so that the transverse connecting piece can be fastened to side plates opposite one another in both rotational orientations.

In a preferred embodiment, the solid material region of the fastening portion has a material thickness in the direction of the longitudinal axis of the transverse connecting piece or perpendicular to the main plane of the plate, which is substantially the same as the material thickness of the side plate in the region around the clamping seat. The solid material region further preferably has a greater material thickness in the height direction and perpendicular to the longitudinal axis compared to a plate-like central region of the transverse connecting piece, in order to achieve the firmest possible frictional fastening in the clamping seat.

Against displacement perpendicular to the main plane of the plate or in the direction of the longitudinal axis of the transverse connecting piece, each clamping seat or each fastening portion can have an elongated transverse locking protrusion extending in the longitudinal direction and, correspondingly, each fastening portion or each clamping seat can have a complementary elongated transverse locking groove. The transverse locking protrusion preferably protrudes from a base surface of the clamping seat and the transverse locking groove is provided as a recess, in particular on the underside in the fastening portion of the transverse connecting piece. A good safeguard against pivoting about the height direction (axis in the main plane of the plate, perpendicular to the longitudinal direction) is also achieved through the elongated extension. For this purpose, it is advantageous if the transverse locking protrusion and the transverse locking groove extend in the longitudinal direction over at least a predominant part of the distance between the clamping surfaces.

The transverse locking protrusion and the transverse locking groove can each hold or fix the support surfaces of the support protrusions in force-transmitting contact with the interior side of the side plate. Thanks to the transverse locking protrusion and the transverse locking groove, for example, a slight pretensioning of the supporting protrusions with their supporting surfaces against the interior side of the side plate can optionally be achieved.

For automatic alignment or centering when inserting the transverse connecting piece into the side plate, it is advantageous if the transverse locking protrusion and transverse locking groove taper or come to a point in the direction of the main plane of the plate.

Preferably, both clamping seats are shaped identically on the narrow sides of a side plate and in particular are arranged in the center and symmetrically to the plate height center plane.

The clamping surfaces can each have at least one convex and/or concave surface region. In a preferred embodiment, it is provided that each clamping surface of the clamping seat has a convex surface region, which preferably represents a predominant surface portion of the clamping surface. This surface portion can in particular widen towards the narrow side or away from the center of the plate, for example, funnel-shaped or trumpet-shaped or the like. Accordingly, the counter-clamping surfaces of the transverse connecting pieces preferably have at least one corresponding concave surface region. The convex surface regions of the clamping seats can be designed, for example, bulged towards the free interior of the clamping seat.

This shaping makes it easier, among other things, to insert or connect the transverse connecting pieces in or to the clamping seats of the side plates, for example, by simply pressing in or driving in in the height direction. Depending on the shape, the connection can also be facilitated with a slight rotation about the longitudinal axis of the transverse connecting piece. In addition to the preferably predominant convex surface region of the clamping surfaces, this can transition into a special, preferably smaller, concave region in order, if necessary, to achieve an additional latching in the height direction.

The convex and/or concave surface regions are preferably designed rounded, when viewed in cross-section to the longitudinal axis of the transverse connecting piece or in the main plane of the plate, so that the manufacturing tolerances are less tight.

In principle, the clamping seat can have any shape, provided a stable, frictional connection is achieved. The clamping seat, however, can in particular be designed in the form of an edge recess opening on both sides to the interior side and exterior side of the side plate on the narrow side or at least predominantly as a breakthrough, that is, partially or predominantly continuously open from the interior side to the exterior side. The clamping seat can preferably be designed as an edge recess integrally in the plate body so that no parts of the plate body protrude laterally in the region of the clamping seats. This makes it easier to insert and remove lines when the transverse connecting piece is open or not yet fastened.

For an angularly rigid connection, in particular against play in the height direction, it is advantageous if each transverse connecting piece has a plate-like center part and, in the end region adjacent each fastening portion and protruding on both sides with respect to the center part, has two support protrusions, each having a support surface for resting against the interior side of the side plate. In this case, the transverse connecting piece can preferably comprise a reinforcing strut starting from each support protrusion, which reinforcing strut runs to the center of the plate-like center part and is made in one piece therewith. Reinforcing struts of this type reinforce the support protrusions against bending, without the need for a significant increase in the material thickness of the transverse connecting piece. For a favorable flow of force, they can converge towards one another in a curved manner, in particular towards the center, and can be formed in one piece or integrally therewith on an exterior side of the transverse connecting piece.

In a preferred embodiment, the chain link consists of four main components, namely two side plates and two opposite, separate and preferably structurally identical transverse connecting pieces for the detachable connection of the side plates to one another.

Thanks to the proposed design of the connection or fastening, each side plate and each transverse connecting piece can be produced inexpensively as a one-piece body made of plastic, in particular without undercuts, for example, as an injection-molded part without undercuts, that is, in an inexpensive so-called open/close injection molding tool without a slide and with a short cycle time.

Second Aspect of the Invention

An independent object according to a second aspect of the invention that is to be considered independent is to expand the functionality of the chain links or side plates in energy guiding chains. This is achieved with a side plate.

A generic side plate according to the second aspect has a plate body made of plastic comprising an interior side, an exterior side facing away therefrom and two narrow sides running substantially parallel to a longitudinal direction of the side plate; wherein the plate body comprises two overlap regions, each for an articulated connection with a corresponding overlap region of a side plate adjacent in the longitudinal direction, and a central region between the overlap regions. The central region can have a greater wall thickness, at least in some regions, compared to the overlap regions. Furthermore, the side plate has a fastening region on each narrow side for a transverse connecting piece, in which a separate transverse connecting piece is detachably fastened or a transverse connecting piece made in one piece with the side plates is connected.

According to the second aspect, the invention proposes that the plate body made of plastic has two through-openings from the exterior side to the interior side, which through-openings are provided in the central region between the fastening regions, that is, in a region of the plate height and the plate length between the fastening regions. According to the invention, each through-opening has an associated functional recess in the plate body into which it opens on the interior side. The functional recess generally has a larger diameter than the through-opening and is provided as a recess or depression on the interior side of the plate body.

In chain links having metal plates, it is already known to provide holes in the central region of the plates, in particular for fastening transverse connecting pieces or traverses by screw connections, as shown in U.S. Pat. No. 4,104,871 A, or for screwing plate halves of forked plates made of sheet steel.

The second aspect of the invention, however, proposes plate bodies made of plastic comprising two through-openings, each of which has an associated, enlarged functional recess on the plate interior side. The functional recess, which can be produced with little effort by injection molding, offers a versatile and, at the same time, easy-to-use option for fastening functional parts to the side plates. For example, the bottom of the functional recess can serve as a border of the through-opening, which is recessed opposite the interior side, for latching connections, clip connections or the like.

The through-openings and functional recesses are preferably designed identical to one another and are arranged symmetrically to the longitudinal center plane (parallel to the longitudinal direction and perpendicularly crossing the main plane of the plate) and to the height center plane (perpendicular to the longitudinal direction and perpendicularly crossing the main plane of the plate) to the side plate.

In a particularly simple and practical embodiment, each through-opening is circular in cross-section and the associated functional recess is arranged coaxially therewith. The functional recess can in particular have a polygonal, in particular hexagonal, cross-section and thus be used, for example, as a holder for a standard hexagon nut or a hexagon head of a screw or the like.

Side plates having through-holes and functional recesses or recesses associated therewith according to the second aspect offer a multitude of possible uses.

For example, a novel arrangement for the end fastening of the energy guiding chain at a connection point can be provided, with an associated end fastening part on each end side plate which comprises a locking pin for fixing in the longitudinal direction, which engages in the functional recess of the assigned side plate. The end fastening part can have a base plate which is designed for fastening at the connection point and, for example, overlaps a transverse connecting piece.

The expansion of the receiving space of an energy guiding chain can also be simplified. For this purpose, an extension arm can be attached laterally to at least some chain links, each on both side plates, which extension arm is connected to the respective side plate by means of a form-fit and/or a frictional connection, in particular a clip connection, by means of the through-openings and functional recesses. Such extension arms can be designed at the other end region such that they can preferably be connected in pairs by means of a transverse connecting piece to form so-called extension brackets. The transverse connecting pieces can be structurally identical to those of the chain links, for example, according to the first aspect mentioned above.

Furthermore, according to the second aspect, two energy guiding chains made of chain links comprising side plates can be fastened to one another in parallel more easily and without complex special parts. At least some side plates can be fastened to one another by means of connectors in a plate strand of one energy guiding chain with side plates in a laterally adjacent plate strand of the other energy guiding chain, which connectors each engage into or are held in the functional recesses through aligned through-openings.

It is also possible, for example, to expand an energy guiding chain with an external line without changing the side plate, according to a principle analogous to WO 2016/146706 A1, wherein a holding adapter for attaching an external line, in particular for a corrugated hose holder, is provided at least on the exterior side of some side plates of a plate strand. According to the second aspect of the invention, unlike in WO 2016/146706 A1, without parts protruding over the side plates, the holding adapter can be fastened by means of connectors which engage into or are held in the functional recesses through the through-openings.

The above arrangements for the second aspect are purely exemplary and not conclusive.

Third Aspect of the Invention

A further independent object according to a third aspect of the invention is to propose a stable end fastening for energy guiding chains that is particularly inexpensive to produce. This is achieved with a transverse connecting piece for a chain link of an energy guiding chain, which comprises a through-hole perpendicular through the body of the transverse connecting piece on both sides between its center part and each end-side fastening portion, adjacent to the respective fastening portion, in particular tangentially thereto or partially intersecting it.

By means of such through-holes, a chain link comprising a transverse connecting piece according to the third aspect can be fastened directly to a connection point by a simple screw connection and by means of the transverse connecting piece itself, for example, using shaft screws to which the through-holes are appropriately dimensioned.

The arrangement of the through-holes in each case in the end region of the longitudinal extension of the transverse connecting piece enables a force flow at least partially or predominantly through the body of the side plate, so that the transverse connecting piece can have a relatively small material thickness despite the fastening function.

The transverse connecting piece is preferably made as a one-piece body made of plastic that extends along a longitudinal axis, in particular symmetrically to a center plane perpendicular to the longitudinal axis. The transverse connecting piece typically has a plate-like center part and on both sides at each end a fastening portion for connection to the side plate, wherein the fastening portions can, for example, but not necessarily, be designed according to the aspect, which allows a particularly robust connection and good force transmission into the side plate.

To increase the flexural strength of the transverse connecting piece, it can have two reinforcing struts starting from each fastening portion, in particular on the exterior side, which reinforcing struts, in particular adjacent to the through-hole, run towards the center of the plate-like center part and are produced in one piece with the body made of plastic. The material thickness of the transverse connecting piece can thus be further reduced despite the fastening function.

All of the above features or aspects are to be seen independently and individually as essential to the invention and can advantageously be used independently of one another in different energy guiding chains for the dynamic guiding of lines. In the so-called full crossbar chain type, all chain links each have two transverse connecting pieces, whereas in the half crossbar chain type, only every second chain link. Aspects of the invention proposed herein can be applied to both types of chain and both to cranked side plates and to alternately successive inner and outer plates. The proposed aspects are further fundamentally applicable to two-part chain links, that is, chain links in which two side plates are produced in one piece with a transverse connecting piece, but particularly advantageous in four-part chain links. In four-part chain links, the side plates and the transverse connecting pieces can be produced as substantially flat components using particularly simple molding tools and at high cycle rates.

BRIEF DESCRIPTION OF THE DRAWINGS

Further details, features and advantages of the invention emerge, without restricting the foregoing, from the following detailed description of preferred embodiments with reference to the accompanying drawings. Shown are.

DETAILED DESCRIPTION

Figure 1A:
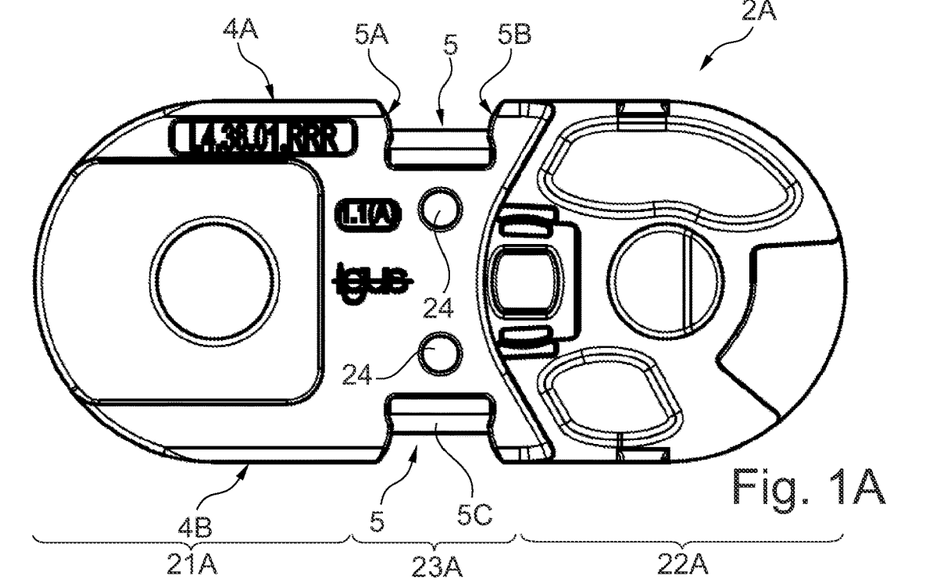
FIG. 1A-1C: a single side plate or link plate in a side view from the exterior side (FIG. 1A), from the interior side (FIG. 1B) and in top view (FIG. 1C)
Figure 1B:
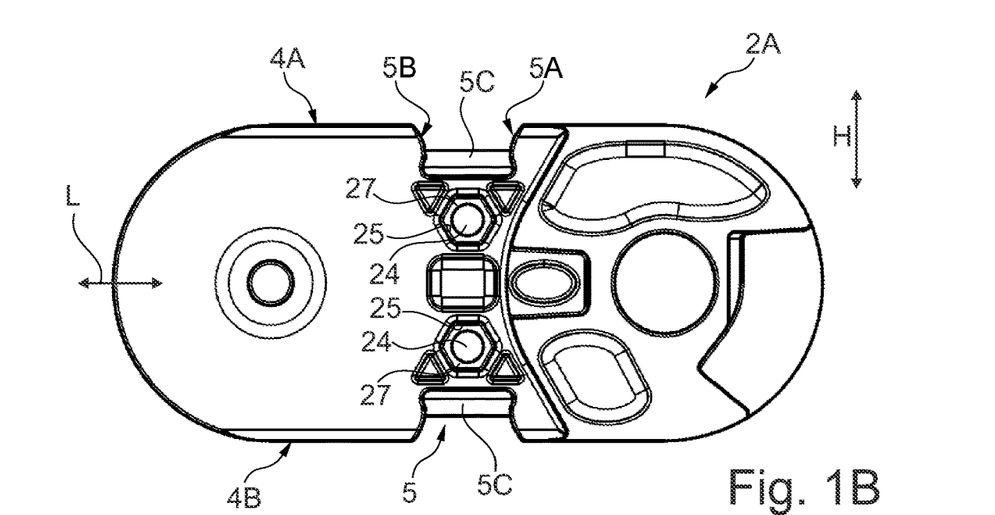
Figure 1C:
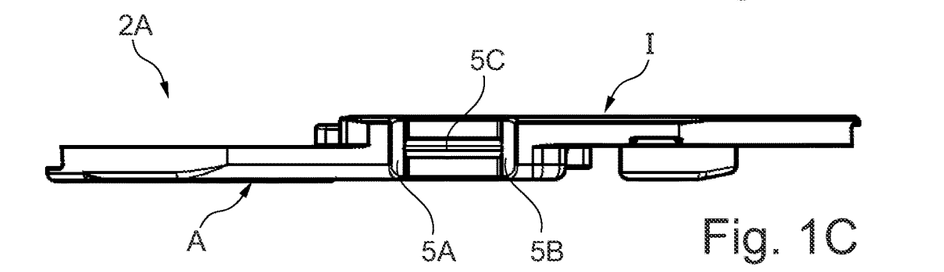
Figure 2A:
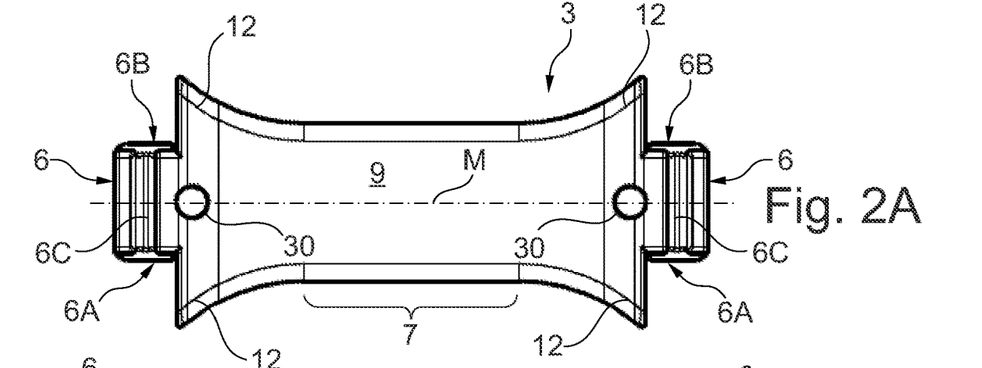
FIG. 2A-2C: a separate transverse connecting piece or opening piece in bottom view (FIG. 2A), side or front view (FIG. 2B) and in top view (FIG. 2C)
Figure 2B:
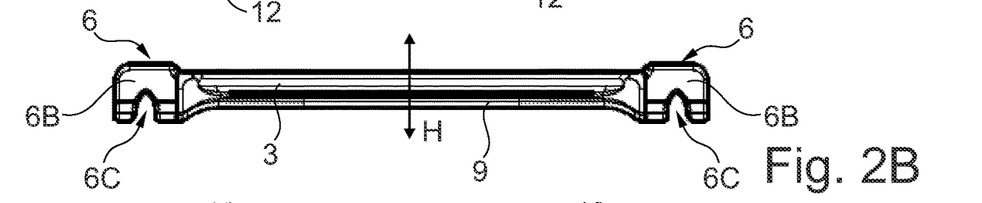
Figure 2C:
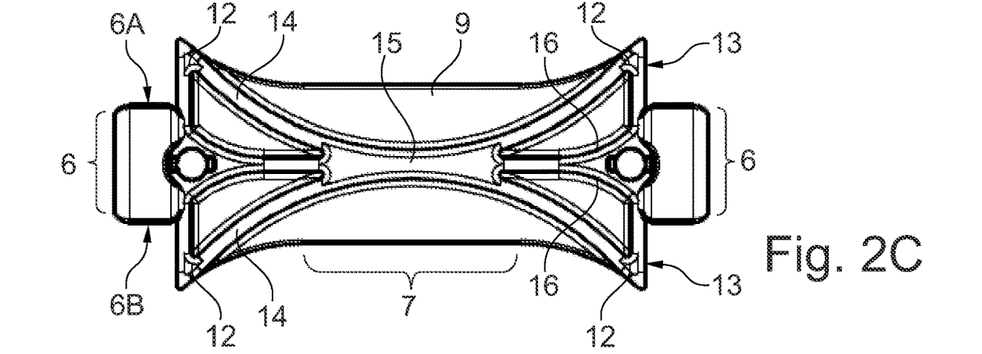
Figure 3A:
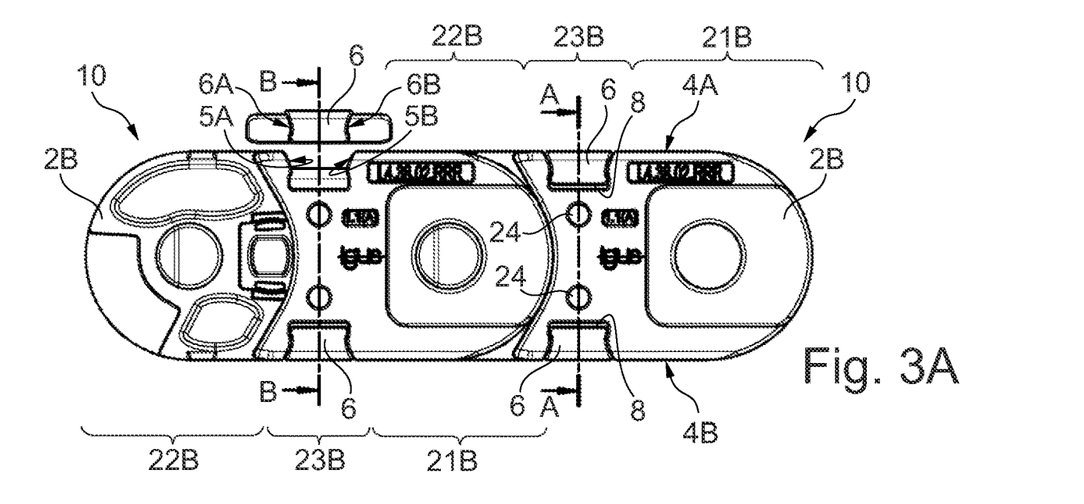
FIG. 3A-3C: chain links having side plates and transverse connecting piece according to FIG. 1-2, in side view (FIG. 3A) and in cross-section with a detached transverse connecting piece (FIG. 3B) and in cross-section of a closed chain link with end fastening screws (FIG. 3C)
Figure 3B:
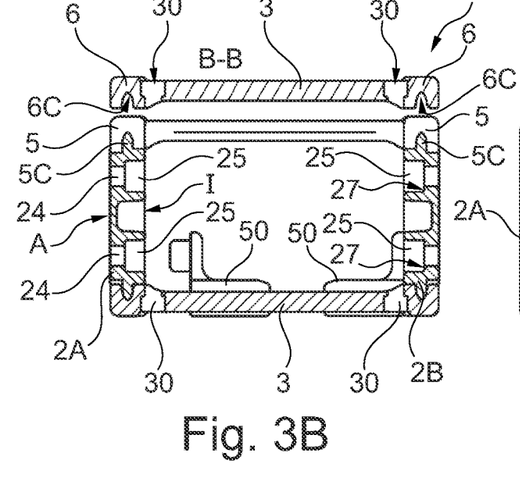
Figure 3C:
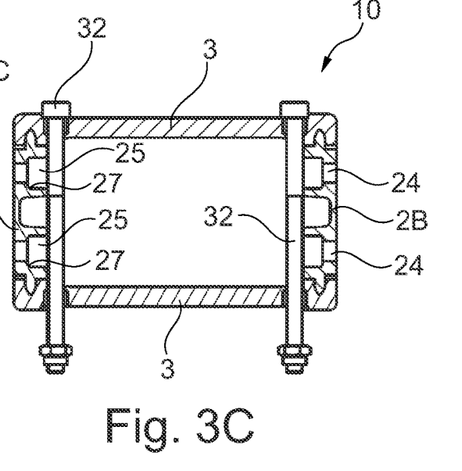

FIG. 1A-3C show the structure of a four-part chain link 10 of an energy guiding chain 1 (FIG. 4) for the dynamic guiding of hoses, cables or the like (not shown) between two connection points. The chain link 10 is rectangular or box-shaped in cross-section, as FIG. 3B shows, for example, according to section line B-B from FIG. 3A, and surrounds a receiving space for carried lines. For this purpose, the chain link 10 is composed of two separate, mirror-symmetrical side plates 2A, 2B and two identical, separate transverse connecting pieces 3 each (FIG. 3C). The side plates 2A, 2B and transverse connecting pieces 3 are produced in one piece from injection-moldable plastic, for example, a polymer, possibly with reinforcing fibers.

To fasten a transverse connecting piece 3, each side plate 3A, 3B has, on both narrow sides 4A, 4B, a clamping seat 5 which is recessed at the edge in the plate body, with two clamping surfaces 5A, 5B opposite one another in the longitudinal direction L, which are formed by the plate body of the side plate 3A, 3B. Between the clamping surfaces 5A, 5B, a complementarily shaped fastening portion 6 of the associated transverse connecting piece 3 is clamped on the respective narrow side 4A, 4B, see FIG. 3A, section lines A-A and B-B. The fastening portion 6 may have a slight oversize and is pressed or pushed into the respective clamping seat 5 with the application of force, preferably without tools.

Each of the two fastening portions 6 at the opposite longitudinal ends of a transverse connecting piece 3 has two counter-clamping surfaces 6A, 6B facing in the longitudinal direction L or running approximately parallel to the longitudinal axis M of the transverse connecting piece 3, which are designed as a counterpart or complementary to the clamping surfaces 5A, 5B.

As can be seen from FIG. 1A-3C, all of the clamping seats 5 on the narrow sides 4A, 4B of a side plate 2A, 2B are each identically shaped and arranged in the longitudinal direction L in the center. The clamping seats 5 are also designed symmetrically to the center plane parallel to the plate height H (perpendicular to the longitudinal direction L). Accordingly, both fastening portions 6 of a transverse connecting piece 3 are identical and each symmetrical to the longitudinal center plane of the transverse connecting piece 3 (contains the central axis M). The transverse connecting piece 3 is overall designed symmetrically to its transverse plane (perpendicular to the central axis M) and to its longitudinal plane. As shown in more detail in FIG. 2A-2C, each fastening portion 6 between its counter-clamping surfaces 6A, 6B is predominantly made of solid material, and here has a continuous region made of solid material and extending perpendicular to the longitudinal axis M. The material thickness of the fastening portion 6 in the direction of the central axis M (or perpendicular to the main plane of the plate) is, as FIG. 3B shows in more detail, substantially the same as the material thickness of the side plate 2A, 2B in the region of the plate body directly around the clamping seat 5, so that the fastening portion 6 ends flush with the exterior side A and the interior side I of the side plates 2A, 2B. Furthermore, the fastening portion 6 has a greater material thickness in the height direction H (plane of FIG. 1B/2B) compared to the plate-like central region 7 of the transverse connecting piece 3.

FIG. 1A-1C show the geometry of the clamping surfaces 5A, 5B, here with a predominantly convex or bulged surface region which widens in the height direction H to the narrow side 4A, 4B in order to facilitate the insertion of a fastening portion 6. The clamping surfaces 5A, 5B are designed here approximately corresponding to an eighth of a circular arc or a tangent function in side view (FIG. 1A-1B); other courses are also possible. In the example shown, the clamping surfaces 5A, 5B run cylindrically in the geometrical sense with envelope curves perpendicular to the main plane of the plate, as FIG. 1C shows; widening to the exterior side A is also possible. The counter-clamping surfaces 6A, 6B are designed at least with a corresponding concave surface region. The convex and concave surface regions of the clamping surfaces 5A, 5B and the counter-clamping surfaces 6A, 6B are designed rounded at least in the cross-section of the seat 5 or the fastening portion 6 perpendicular to the central axis M, that is, in the main plane of the plate (plane parallel to FIG. 1A/1B), which also avoids notch stresses. In the lower region of the recess 5, the clamping surfaces 5A, 5B can towards the center of the plate via a turning point into a small surface portion that is concave in order to achieve an additional latching function with a corresponding subregion of the counter-clamping surfaces 6A, 6B. The depth of each recess 5 is slightly greater than the material thickness of the fastening portions 6 in the height direction, so that when the transverse connecting pieces 3 are inserted, a narrow insertion gap 8 remains on the exterior side A of the side plates 2A, 2B, which allows the frictionally, firmly pressed-in transverse connecting piece to be levered out, for example, by means of a screwdriver.

As FIG. 2A-2C further show, the transverse connecting piece 3 has a plate-like center part 7 having a relatively thin ground plate 9. In both end regions, the transverse connecting piece 3 has two wing-like support protrusions 12 adjacent each fastening portion 6 and on both sides opposite the center part 7. The support protrusions 12 protrude from the ground plate 9 perpendicular to the longitudinal axis M in the longitudinal direction L and also towards the interior or the center of the plate. Support protrusions 12 each form a support surface 13 perpendicular to the longitudinal axis M to rest against the interior side I of the side plate 2A, 2B for twisting connection thereto and also for slightly overlapping the end region of the adjacent side plate (FIG. 4) as a transverse safeguard. To save material, the transverse connecting piece 3 has several reinforcing struts on its side facing away from the interior of the chain link 10. Outer reinforcing struts 14 extend from each support protrusion 12 and run in a curved manner to form a common central reinforcing strut 15 in the center in the center part 7. Inner reinforcing struts 16 also transition into the center reinforcing strut 15 in a curved manner from the edge region of the fastening portions 6. The reinforcing struts 14, 15, 16, like the fastening portions 6, are produced in one piece with the ground plate 9. The reinforcing struts 14, 15, 16 allow the ground plate 9 to have a small wall thickness, that is, among other things, to reduce the weight of the chain.

As can best be seen from FIG. 1A-1C and FIG. 3B-3C, each clamping seat 5 has a transverse locking protrusion 5C running in the longitudinal direction L, which with a complementary elongated transverse locking groove 6C on the underside of the fastening portion 6 secures the transverse connecting piece 3 from being displaced in the direction of the longitudinal axis M. In the embodiment shown here, the transverse locking protrusion 5C runs completely through between the clamping surfaces 5A, 5B and the transverse locking groove 6C correspondingly runs completely through to the counter-clamping surfaces 6A, 6B. An additional stiffening against pivoting of the fastening portion 6 about the height axis of the side plate 2A, 2B is also achieved with a sufficient overall length in the longitudinal direction L. As FIG. 3B shows, the transverse locking protrusion 5C and the transverse locking groove 6C are designed to taper or come to a point away from the center of the plate, which achieves centering and requires less tight manufacturing tolerances.

The clamping seats 5 of the side plates 2A, 2B and corresponding fastening portions 6 of the transverse connecting piece(s) 3 enable a robust, torsion-resistant fastening between the transverse connecting pieces 3 and the side plates 2A, 2B and at the same time, due to the relatively simple geometry, allow a simplification of the injection molding tools compared to connection solutions from the prior art.

A second aspect of the invention is now explained in more detail with reference to FIG. 1A—FIG. 8, in particular with reference to FIG. 4.

The side plates 2A, 2B each have two overlap regions 21A, 22A or 21B, 22B with a pivot pin protruding in one piece or a seat formed therein. These serve in a known manner for the articulated connection to a corresponding overlap region 22A, 21A or 22B, 21B of a side plate 2A or 2B which is adjacent in the longitudinal direction, here structurally identical, as can be seen, for example, from FIG. 3A. Between the overlap regions 21A, 22A and 21B, 22B, the side plates 2A, 2B each have a central region which, compared to the overlap regions, has a partially greater wall thickness.

According to the second aspect, each side plate 2A, 2B in the plate body has two identical through-openings 24, here circular cylindrical breakthroughs, from the exterior side to the interior side, which are provided in the central region 23A or 23B and between the fastening regions or clamping seats 5. The through-openings 24 lie centrally on the height center plane, see A-A in FIG. 3A, of the side plate 2A and 2B and are arranged symmetrically to the longitudinal center plane or at an identical distance from the narrow sides 4A, 4B.

According to the second aspect, each through-opening 24 has a coaxially associated functional recess 25 in the plate body of the side plate 2A or 2B. Each functional recess 25 opens outwards into the through-opening 24 or vice versa, as can be seen in FIG. 3A-3B. As can best be seen from FIG. 1B, the functional recess 25 has an enlarged diameter compared to the through-opening 24 and is provided on the interior side I.

Unlike the through-openings 24, which are circular in cross-section, the functional recesses 25 are designed with a hexagonal cross-section, as shown in FIG. 1B, in order to enable a form-fit with interacting components such as hexagonal connectors. The enlarged functional recess 25 also forms, as a bottom surface that borders the through-opening 24, a support surface 27 in the body of the side plate 2A, 2B on which latching connections, clip connectors or the like can engage or grip behind the through-opening 24, as explained below by way of example. The functional recess 25 extends the functionality of the side plate 2A; 2B or enables a modular construction kit system for special applications of the energy guiding chain 1.

Figure 4:
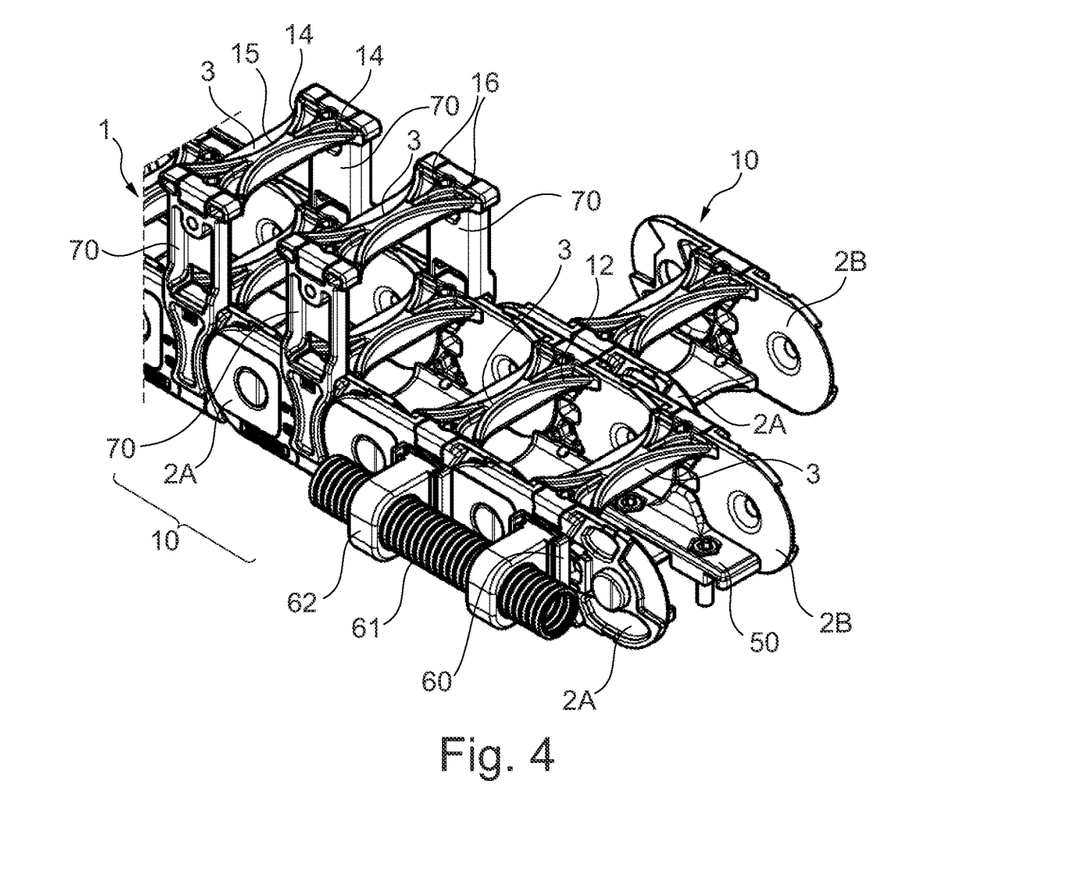
FIG. 4: a perspective view of chained chain links with partial representation of different functional components on or in the chain links with side plates and transverse connecting pieces according to FIG. 1-2.

An arrangement for end fastening is shown by way of example in FIG. 3B and FIG. 4, wherein an associated end fastening part 50 is provided on each side plate 2A, 2B. The end fastening part 50 is produced as a one-piece plastic part and has a base plate 51 which is designed for screw connection to a connection point with hexagonal cutouts at the end. The base plate 51 has a lower recess 52 with which it overlaps a transverse connecting piece 3, see FIG. 3B. A locking pin 53, in the form of a hexagon, is provided in a central region protruding in the height direction H for fixing in the longitudinal direction, which engages in the functional recess 25 of the associated side plate 2A or 2B in the assembled state (FIG. 3B right).

Figure 6:
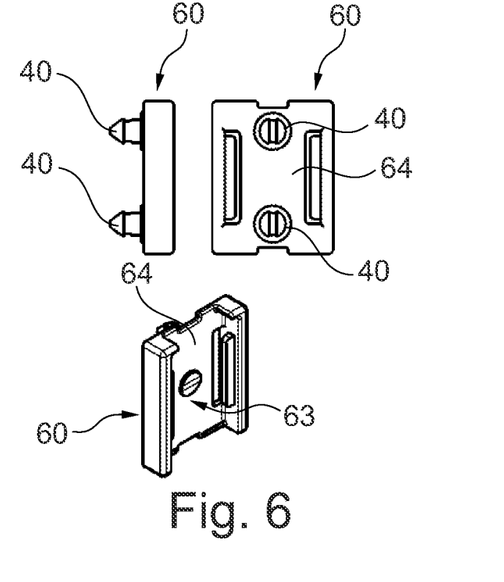

FIG. 4 (bottom) shows in connection with FIG. 6, only by way of example in a sub-portion of the energy guiding chain 1, an arrangement for expanding the energy guiding chain 1 with an external line which is carried in a corrugated hose 61. The corrugated hose 61 is fastened to the exterior sides of every n-th side plate 2A or 2B by means of corrugated hose holders 62, for example, of a commercially available type. For this purpose, FIG. 6 shows a special holding adapter 60, with a seat 63 for receiving a corrugated hose holder 62. Clip connectors 40 are provided on the back side of the ground plate 64, with a shaft matching the through-openings 24 and latching hooks for the functional recesses 25. The clip connectors 40 engage through the through-openings 24 into the functional recesses 25, and the support surface 27 grip behind or are held thereon.

Figure 7:
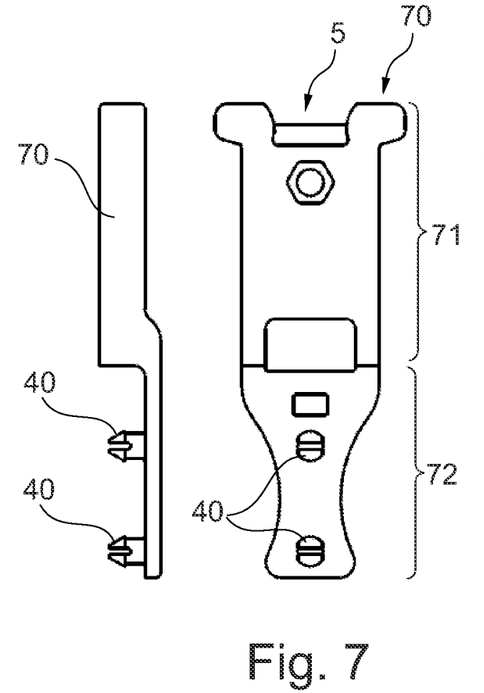

FIG. 4 further shows, only by way of example in a sub-portion of the energy guiding chain 1, an arrangement for expanding the receiving space by means of multi-part expansion brackets. An extension arm 70, see FIG. 7, is attached to at least some chain links 10, each on the exterior side A and on both side plates 2A, 2B. The extension arm 70 has an upper part 71 having an upper-side clamping seat 5, identical to the clamping seat 5 described above for the side plates 2A, 2B. Thus, the upper end of two extension arms 70 can be connected by means of a transverse connecting piece 3 to form an extension bracket to one side of the link plate 10 (FIG. 4, top left), in which further lines or, for example, a hose having a larger diameter can be carried. The outwardly cranked lower part 72 of the extension arm 70 has two inwardly directed clip connectors 40, which by form-fit and/or frictional connection engage in the functional recesses 25 of the respective side plate 2A, 2B and engages behind the support surface 27. The extension arm 70 is made in one piece with the clip connector n 40 in plastic.

Figure 5:
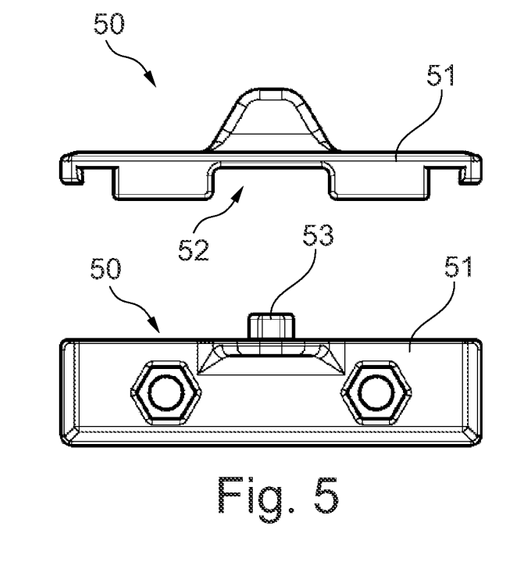
FIG. 5-8: various functional components from FIG. 4, namely an end fastening part (FIG. 5) in side view and top view; a holding adapter for a corrugated hose holder (FIG. 6) in different views; an extension arm for the expansion of the receiving space (FIG. 7) in front and side views and a clip connector for coupling plate strands (FIG. 8) in different views.
Figure 8:
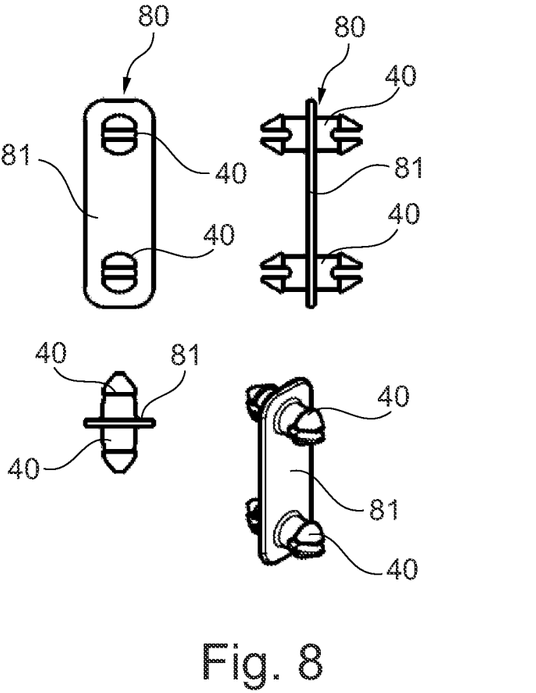

FIG. 4 (right) shows, in connection with FIG. 8, only by way of example on a chain link 10, an arrangement for expanding the energy guiding chain 1 by means of a parallel connection to a further energy guiding chain 1. For this purpose, the side plates 2A; 2B can be fastened to one another with little assembly effort in laterally adjacent plate strands by means of the through-openings 24 with functional recesses 25, analogous to FIG. 5-6. For this purpose, FIG. 8 shows special double-sided chain plate connectors 80 with a ground plate 81 on which clip connectors 40 are provided on both sides, as described for FIG. 6-7. Using chain plate connectors 80 of this type, two or more energy guiding chains 1 can be particularly easily fastened to one another in parallel, for example, in order to guide a larger number of lines. The chain plate connectors 80 also use two through-openings 24 with functional recesses 25 here on both sides for fastening.

Finally, a third aspect is described with reference to FIG. 3B-3C and FIG. 2A-2C, which allows a particularly cost-effective end fastening without additional parts such as the end fastening part.

For this purpose, the transverse connecting pieces 3 each have a through-hole 30 between the center part 7 and each fastening portion 6. The through-hole 30 is adjacent to the respective fastening portion 6, in FIG. 3B-3C, this is arranged slightly intersecting. The through-hole 30 extends vertically through the body of the transverse connecting piece 3, so that a chain link 10 having only one fastening screw 32 on each side can be fastened through the transverse connecting piece 3 at a connection point. The head of the fastening screw 32 can be at least partially supported on the fastening portion 6 (FIG. 3C) so that the tensioning or clamping force is transmitted to and through the side plate 2A, 2B. For better stability, the transverse connecting piece 3 has, starting from the fastening portion 6, the inner reinforcing struts 16, which run adjacent to the through-hole 30 towards the central part 7 and transition into the central reinforcing strut 15. The head of the fastening screw 32 can also be partially supported on the reinforcing struts 16.

LIST OF REFERENCE SYMBOLS 1 energy guiding chain
2A; 2B side plates
3 transverse connecting piece
4A, 4B narrow sides (side plate)
5 clamping seat
5A, 5B clamping surface
5C transverse locking protrusion
6 fastening portion (transverse connecting piece)
6A, 6B counter-clamping surfaces
6C transverse locking groove
7 central region
8 insertion gap
9 ground plate
10 chain link
12 support protrusion
13 support surface
14, 15, 16 reinforcing strut
21A, 22A; 21B, 22B overlap region
23A; 23B central region
24 through-opening
25 functional recess
30 through-hole (for fastening screw)
32 fixing screw 40 clip connector
50 end fastening part
51 base plate
52 recess
53 locking pin
60 holding adapter
61 corrugated hose
62 corrugated hose holder
63 seat (for corrugated hose holder)
64 ground plate
70 extension arm
71 upper part
72 lower part
80 chain link connector
81 ground plate
A exterior side
I interior side
L longitudinal direction
H height direction

What is claimed is:

1. A chain link of an energy guiding chain for guiding at least one line between two connection points, wherein at least one of the two connection points is movable relatively to the other connection point, the chain link being composed of several individual parts, wherein the several individual parts include:
   two side plates, each of the two side plates comprising a plate body made of plastic and having an interior side facing an interior of the chain link, an exterior side facing away therefrom and two narrow sides running parallel to a longitudinal direction of the side plate; and
   at least one separate transverse connecting piece for a detachable connection of the two side plates, the at least one transverse connecting piece comprising a center part and a fastening portion on both sides of the center part at each end of the at least one transverse connecting piece;
   the two side plates each comprising a corresponding fastening region on at least one narrow side of the two narrow sides, wherein the fastening region interacts by a form-fit and/or a frictional connection with the fastening portion of the at least one transverse connecting piece;
   the fastening region comprises a clamping seat in the plate body, wherein the clamping seat comprises two clamping surfaces of the plate body opposite one another in the longitudinal direction, wherein a complementarily shaped fastening portion of the at least one transverse connecting piece is clamped through a clamping force between the two clamping surfaces of the plate body, wherein the at least one transverse connecting piece is produced in one piece from plastic and has, in an end region adjacent the fastening portion and protruding on both sides opposite the center part, two support protrusions each having a support surface for resting against the interior side of the side plate;
   wherein the clamping seats on the narrow sides of each of the side plates are shaped identically, wherein the two clamping surfaces each have a convex surface region, wherein the convex surface region is rounded, and wherein the convex surface region widens towards the narrow side, and that counter-clamping surfaces of the two fastening portions of the at least one transverse connecting piece are configured with at least one corresponding concave surface region, wherein the concave surface region is rounded.

2. The chain link according to claim 1, wherein the fastening portion of the at least one transverse connecting piece comprises the two counter-clamping surfaces facing in the longitudinal direction, the two counter-clamping surfaces being configured complementary to the clamping surfaces, and the fastening portion comprises a solid material region continuous between the counter-clamping surfaces.

3. The chain link according to claim 2, wherein the solid material region of the fastening portions has a material thickness in a direction of a longitudinal axis of the at least one transverse connecting piece equal to a material thickness of the side plate around the clamping seat and/or has a greater material thickness in a height direction compared to the center part of the at least one transverse connecting piece.

4. The chain link according to claim 1, wherein the clamping seat in the plate body has an elongated transverse locking protrusion extending in the longitudinal direction and, correspondingly, the fastening portion of the at least one transverse connecting piece has a complementary elongated transverse locking groove which hold against displacement perpendicular to a main plane of the side plate and hold the support surfaces of the support protrusions in contact with the interior side of the side plate.

5. The chain link according to claim 4, wherein the transverse locking protrusion and the transverse locking groove extend in the longitudinal direction over at least a predominant part of a distance between the clamping surfaces or the counter-clamping surfaces of the two fastening portions of the at least one transverse connecting piece and/or taper or come to a point in a direction of the main plane of the side plate.

6. The chain link according to claim 1, wherein the clamping seat in the plate body is configured:
   in a form of an edge recess opening on both sides to the interior side and to the exterior side of the side plate on the narrow side; and/or
   as an edge recess continuous at least partially between the interior side and exterior side integrally in the plate body.

7. An arrangement for expansion of an energy guiding chain with an external line, comprising several chain links each comprising a side plate having a plate body made of plastic and having an interior side, an exterior side facing away therefrom and two narrow sides running parallel to a longitudinal direction of the side plate;
   the plate body having two overlap regions, each for an articulated connection to a corresponding overlap region of another side plate adjacent to the side plate in the longitudinal direction, and a central region between the overlap regions, having greater wall thickness compared to the overlap regions; and
   the side plate having a fastening region for a transverse connecting piece on each of the narrow sides, wherein the plate body has two through-openings from the exterior side to the interior side, the two through-openings being provided in the central region between the fastening regions, wherein each of the two through-openings opens into an associated functional recess in the plate body, wherein the functional recess has a larger diameter than the through-opening and is provided on the interior side of the plate body;
the arrangement further comprising a holding adapter for attaching the external line, the holding adapter being provided at least on the exterior side of some side plates of a plate strand, which holding adapter is fastened by connectors, wherein the connectors engage the functional recesses or are held in the functional recesses.

8. An arrangement for expansion of a receiving space of an energy guiding chain comprising several chain links each comprising two side plates, each side plate of the two side plates having a plate body made of plastic and having an interior side, an exterior side facing away therefrom and two narrow sides running parallel to a longitudinal direction of the side plate;

the plate body having two overlap regions, each for an articulated connection to a corresponding overlap region of another side plate adjacent to the side plate in the longitudinal direction, and a central region between the overlap regions, having greater wall thickness compared to the overlap regions; and the side plate having a fastening region for a transverse connecting piece on each of the narrow sides, wherein the plate body has two through-openings from the exterior side to the interior side, the two through-openings being provided in the central region between the fastening regions, wherein each of the two through-openings opens into an associated functional recess in the plate body, wherein the functional recess has a larger diameter than the through-opening and is provided on the interior side of the plate body;

each chain link further comprising two transverse connecting pieces opposite one another which connect the two side plates to one another, at least some chain links having a laterally attached extension arm on both side plates, which extension arm is connected to the respective side plate by a form-fit and/or a frictional connection by the functional recesses, the extension arms each being connected by another transverse connecting piece.

* * * * *